(12) United States Patent
Russell

(10) Patent No.: US 7,055,313 B2
(45) Date of Patent: Jun. 6, 2006

(54) ENGINE CONTROL SYSTEM AND METHOD WITH LEAN CATALYST AND PARTICULATE FILTER

(75) Inventor: John David Russell, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 802 days.

(21) Appl. No.: 09/790,831

(22) Filed: Feb. 22, 2001

(65) Prior Publication Data

US 2001/0005988 A1 Jul. 5, 2001

Related U.S. Application Data

(63) Continuation of application No. 09/382,363, filed on Aug. 24, 1999, now Pat. No. 6,237,326.

(51) Int. Cl.
*F01N 3/00* (2006.01)

(52) U.S. Cl. .............. 60/295; 60/274; 60/276; 60/286; 60/297; 60/311

(58) Field of Classification Search ............ 60/274, 60/286, 295, 297, 311, 276
See application file for complete search history.

(56) References Cited

U.S. PATENT DOCUMENTS

| | | | | |
|---|---|---|---|---|
| 4,449,362 A | | 5/1984 | Frankenberg et al. | |
| 4,509,327 A | * | 4/1985 | Enga | 60/285 |
| 4,522,028 A | * | 6/1985 | Hasegawa et al. | 60/277 |
| 4,557,108 A | * | 12/1985 | Torimoto | 60/286 |
| 4,567,725 A | * | 2/1986 | Shinzawa et al. | 60/286 |
| 4,665,690 A | | 5/1987 | Nomoto et al. | |
| 5,052,178 A | * | 10/1991 | Clerc et al. | 60/274 |
| 5,063,736 A | | 11/1991 | Hough et al. | |
| 5,067,320 A | * | 11/1991 | Kanesaki | 60/297 |
| 5,121,601 A | * | 6/1992 | Kammel | 60/286 |
| 5,170,147 A | * | 12/1992 | Graffagno et al. | 340/449 |
| 5,193,340 A | | 3/1993 | Kamihara | |
| 5,195,316 A | | 3/1993 | Shinzawa et al. | |
| 5,195,317 A | | 3/1993 | Nobue et al. | |
| 5,207,990 A | | 5/1993 | Sekiya et al. | |
| 5,211,009 A | * | 5/1993 | Houben et al. | 60/286 |
| 5,419,121 A | * | 5/1995 | Sung et al. | 60/274 |
| 5,628,186 A | | 5/1997 | Schmelz | |
| 5,701,735 A | | 12/1997 | Kawaguchi | |
| 5,725,618 A | | 3/1998 | Shimoda et al. | |
| 5,746,989 A | | 5/1998 | Murachi et al. | |
| 5,826,425 A | | 10/1998 | Rossi Sebastiano et al. | |
| 5,850,735 A | | 12/1998 | Araki et al. | |

(Continued)

FOREIGN PATENT DOCUMENTS

EP 0070619 1/1983

(Continued)

*Primary Examiner*—Thomas Denion
*Assistant Examiner*—Diem Tran
(74) *Attorney, Agent, or Firm*—Allan J. Lippa; Allerman Hall McCoy Russell & Tuttle LLP

(57) ABSTRACT

A method for controlling reductant added to an exhaust of an engine having a lean NOx catalyst and a particulate filter adjusts a reductant amount during particulate filter regeneration. The method adjusts the reductant amount to account for reducing agents released from the particulate filter that are experienced by the lean NOx catalyst. In addition, management of particulate filter regeneration is based on both an estimated amount of stored particles and conditions of the lean NOx catalyst. In this way, operation of both the particulate filter and the lean NOx catalyst can be optimized. Also, termination of particulate filter regeneration is determined based on operating conditions.

11 Claims, 6 Drawing Sheets

U.S. PATENT DOCUMENTS

| | | | |
|---|---|---|---|
| 5,974,791 A | 11/1999 | Hirota et al. | |
| 5,974,794 A | 11/1999 | Gotoh et al. | |
| 6,021,639 A | 2/2000 | Abe et al. | |
| 6,023,930 A | 2/2000 | Abe et al. | |
| 6,032,461 A | 3/2000 | Kinugasa et al. | |
| 6,167,696 B1 * | 1/2001 | Maaseidvaag et al. | 60/274 |

FOREIGN PATENT DOCUMENTS

| | | | |
|---|---|---|---|
| EP | 0859132 A1 | | 8/1998 |
| JP | 59122721 | | 7/1984 |
| JP | 405231133 | * | 9/1993 |

* cited by examiner

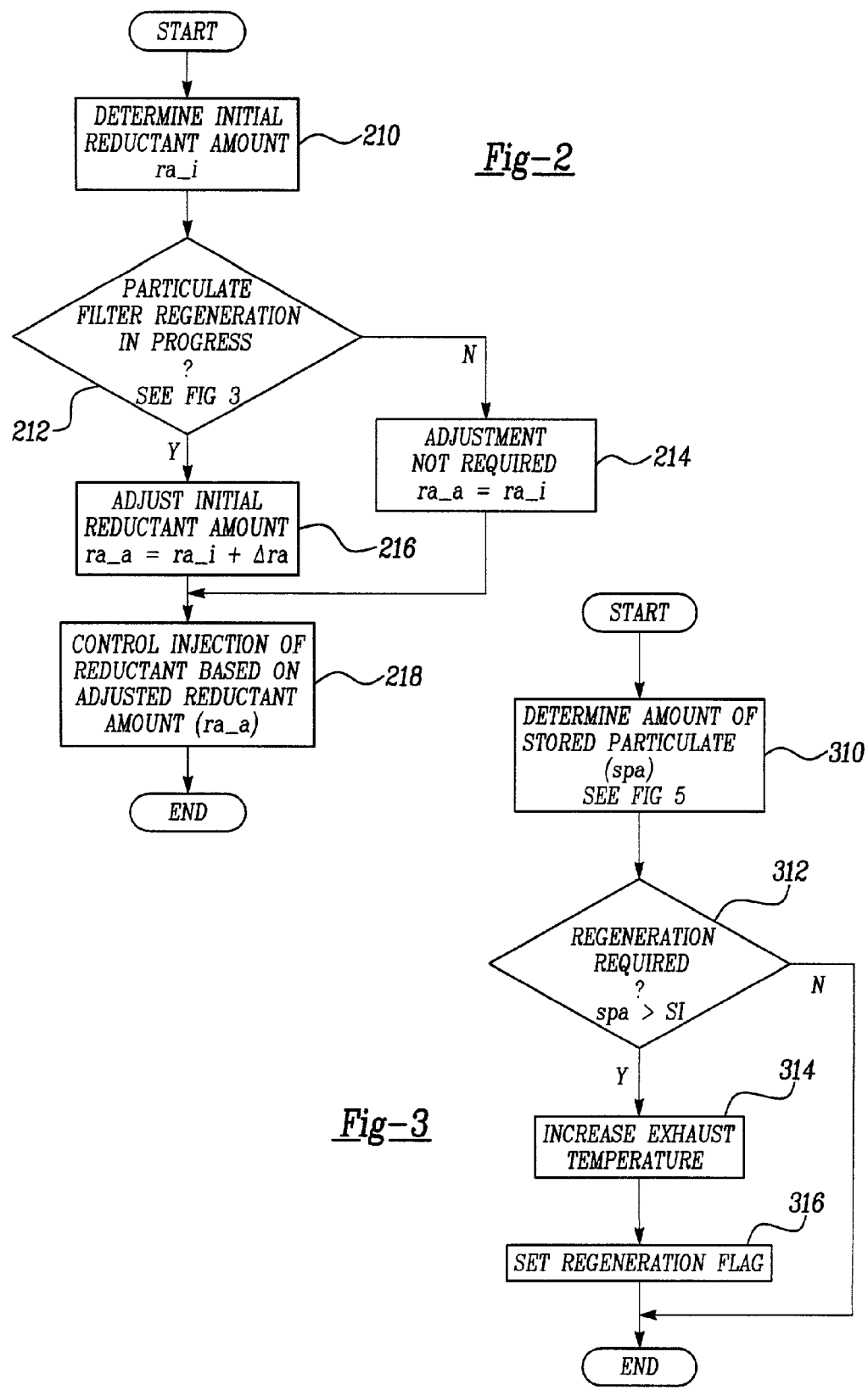

ENGINE CONTROL SYSTEM AND METHOD WITH LEAN CATALYST AND PARTICULATE FILTER

This application is a continuation of U.S. application Ser. No. 09/382,363, filed Aug. 24, 1999, now U.S. Pat. No. 6,237,326.

FIELD OF THE INVENTION

The present invention relates to a system and method for controlling an engine having both a lean NOx catalyst for reducing exhaust NOx in an oxygen rich environment and a particulate filter for removing carbon particles, or soot.

BACKGROUND OF THE INVENTION

In order to meet future emission regulations in vehicles having a compression ignition engine, it may be necessary to use lean NOx catalysts in combination with particulate filters.

A NOx catalyst reduces NOx emissions continuously, even in an oxygen rich environment. For an active NOx catalyst to maximize NOx reduction, a reducing agent, for example, diesel fuel or urea, needs to be present. The optimum amount of reducing agent for the NOx catalyst is typically based on engine operating conditions and catalyst conditions. These conditions typically include engine speed, engine load, and catalyst temperature.

A particulate filter, also commonly used with compression ignition engines, is used to prevent soot, or carbon particles, from exiting the tailpipe. Since the particulate filter has a limited storage capacity, it is periodically regenerated. In one approach, during the regeneration process, exhaust temperature is increased to ignite carbon particles stored in the particulate filter. By burning the stored carbon particles, the filter is regenerated and able to again store the carbon particles. In addition, the burning of the carbon particles causes an increase in temperature.

One approach for managing a particulate filter estimates that amount of stored particulates and then regenerates the filter when this amount reaches a predetermined value. This decision can be augmented based on a vehicle operating zone defined by engine speed and load. Such a system is describe by EP 0 859 132.

The inventor herein has recognized numerous disadvantages when using prior particulate filter management systems when a NOx catalyst is present. In particular, the above management system does not consider the state of the NOx catalyst when determining filter regeneration. For example, the prior art does not consider conditions where heat generated from regeneration raise NOx catalyst temperature beyond appropriate limits.

SUMMARY OF THE INVENTION

An object of the present invention is to manage particulate regeneration system where an exhaust stream of a compression ignition engine is coupled to both a particulate filter and a lean NOx catalyst.

The above object is achieved and disadvantages of prior approaches overcome by a method for managing regeneration of a particulate filter communicating with an engine exhaust upstream of a catalyst, the method comprising: estimating an amount of stored particulates in the particulate filter; and regenerating the particulate filter dependent upon said amount and a condition of the catalyst.

By including catalyst conditions in regeneration of the particulate filter, it is possible coordinate operation of both the particulate filter and the catalyst, thereby improving performance of the overall system. Further, it is possible to avoid degradation of the catalyst using a catalyst condition in controlling regeneration of the particulate filter.

An advantage of the above aspect of the present invention is improved system durability.

Another advantage of the above aspect of the present invention is improved system performance.

BRIEF DESCRIPTION OF THE DRAWINGS

The objects and advantages described herein will be more fully understood by reading an example of an embodiment in which the invention is used to advantage, referred to herein as the Description of Preferred Embodiment, with reference to the drawings, wherein:

FIGS. 2–7 are high level flow charts of various operations performed by a portion of the embodiment shown in FIGS. 1A and 1B.

DESCRIPTION OF PREFERRED EMBODIMENT(S)

Figure 1A:
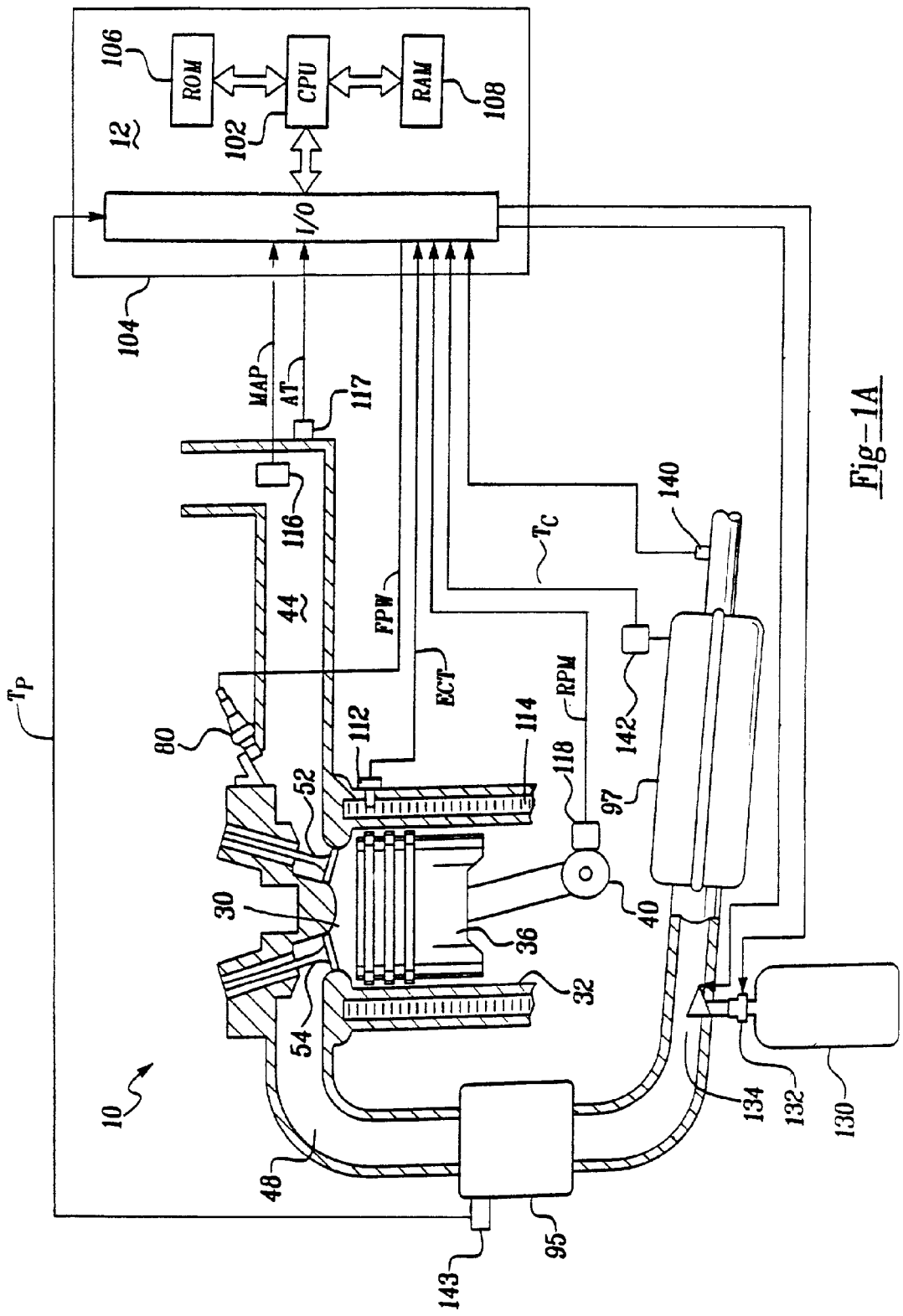
FIGS. 1A and 1B schematic diagrams of an engine wherein the invention is used to advantage.

Internal combustion engine 10, comprising a plurality of cylinders, one cylinder of which is shown in FIG. 1A, is controlled by electronic engine controller 12. Engine 10 includes combustion chamber 30 and cylinder walls 32 with piston 36 positioned therein and connected to crankshaft 40. Combustion chamber 30 is known communicating with intake manifold 44 and exhaust manifold 48 via respective intake valve 52 and exhaust valve 54. Intake manifold 44 is also shown having fuel injector 80 coupled thereto for delivering liquid fuel in proportion to the pulse width of signal FPW from controller 12. Both fuel quantity, controlled by signal FPW and injection timing are adjustable. Fuel is delivered to fuel injector 80 by a diesel fuel system (not shown) including a fuel tank, fuel pump, and fuel rail (not shown). Alternatively, the engine may be configured such that the fuel is injected directly into the cylinder of the engine, which is known to those skilled in the art as a direct injection engine.

Reducing agent, for example, ammonia or diesel fuel, is stored in storage vessel 130 coupled to exhaust manifold 48 upstream of particulate filter 95 and lean NOx catalyst 97. In an alternative embodiment (not show) diesel fuel can be stored solely in the fuel tank and supplied to the exhaust system. Also, catalyst 97 is lean NOx catalyst capable of reducing NOx in an oxygen rich environment. Efficiency of catalyst 97 is increased in the presence of a reducing agent.

Control valve 134 controls the quantity of reducing agent delivered to the exhaust gases entering catalyst 97. Pump 132 pressurizes the reducing agent supplied to control valve 134. Both Pump 132 and control valve 134 are controlled by controller 12. Ammonia sensor 140 is shown coupled to exhaust manifold 48 downstream of catalyst 97. Temperature sensor 142 coupled to catalyst 97 provides an indication of the temperature (T) of catalyst 97. Alternatively, catalyst temperature (T) can be estimated as described later herein with particular reference to FIG. 6. Similarly, particulate filter temperature (Tp) can be read from sensor 143 or estimated using methods known to those skilled in the art based on exhaust gas temperature.

Particulate filter 95 is capable of storing carbon particles from the exhaust. Particulate filter 95 can be regenerated by increasing temperature (Tp) to a point where the stored particles ignite and burn away. Particulate filter 95 is a standard particulate filter as is known to those skilled in the art.

Controller 12 is shown in FIG. 1 as a conventional microcomputer including: microprocessor unit 102, input/output ports 104, read-only memory 106, random access memory 108, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of manifold pressure (MAP) from pressure sensor 116 coupled to intake manifold 44; a measurement (AT) of manifold temperature from temperature sensor 117; an engine speed signal (RPM) from engine speed sensor 118 coupled to crankshaft 40.

Figure 1B:
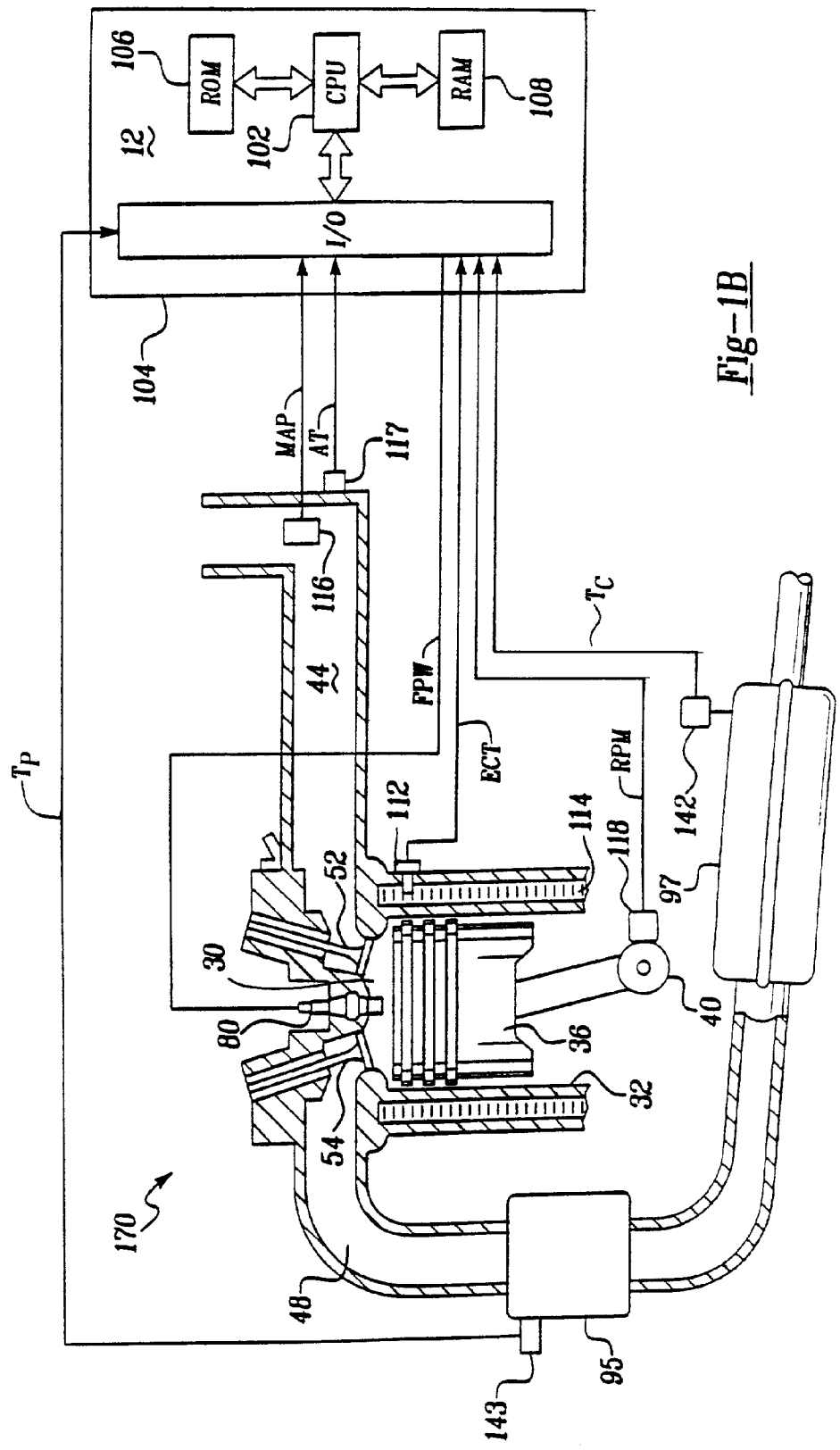

Referring now to FIG. 1B, an alternative embodiment shown where engine 170 is a direct injection engine with injector 80 located to inject fuel directly into cylinder 30. In this example, reductant, or diesel fuel, is delivered to the exhaust system by injector 80 during either or both of a power or exhaust stroke of engine 170.

Referring now to FIG. 2, a routine for controlling injection of a reductant into exhaust flow is described. First, in step 210, the initial reductant injection amount (ra_i) is calculated based on engine operating conditions. These conditions include conditions known to those skilled in the art to indicate the amount of nitrogen oxide produced by the combustion process. These conditions include: engine speed, engine load, exhaust temperatures, and catalyst temperatures. Other conditions, such as injection timing, engine temperature, and any other parameter known to those skilled in the art to affect engine nitrogen oxide production, can also be used. Next, in step 212, a determination is made if the particulate filter is currently in the regeneration process, as described later herein with particular reference to FIG. 3. When the answer to step 212 is YES, the routine continues to step 216, where initial reductant amount (ra_i) is adjusted by adjustment amount Δra. Adjustment amount (Δra) is determined as described later herein with particular reference to FIG. 6. In particular, adjustment amount (Δra) is determined based on the amount of reductant released from the particulate filter during regeneration of the particulate filter. Otherwise, in step 214, adjustment of the initial reductant amount is not required.

Those skilled in the art will recognize that there are many alternate embodiments to the previous steps of determining an initial reductant amount and an adjustment amount. For example, one equivalent alternative is to use two separate calculations for determining a reductant injection amount, one during regeneration and the other during non-regenerating conditions. This, or any other method that adds reductant to the exhaust dependent on particulate filter regeneration, can therefore be equivalently used in the present invention.

Continuing with FIG. 2, the injection of reductant, through either valve 134 or through late injection through injector 80 in FIG. 1B, is controlled at step 218 based on adjusted reductant amount (ra_a) as determined in either step 214 or step 216. In this way, an optimum amount of reductant can be injected, including compensation for particulate filter regeneration. The reductant can be injected in step 218 in many ways, including: blade injection by a mean fuel injector in the combustion chamber so that fuel is injected during the exhaust stroke, external reductant injection where the reductant is injected directly into the exhaust stream, or any other method known to those skilled in the art for providing reductant to a catalyst.

Referring now to FIG. 3, the routine for determining if regeneration of the particulate filter is required is described. First, in step 310, the amount of stored particulate (spa) is determined, as described later herein with particular reference to FIG. 5. Next, in step 310, the determination is made as to whether regeneration is required by comparing stored particulate amount (spa) to a first particulate threshold (S1). When the answer to step 312 is YES, the routine continues to step 314 where engine parameters are controlled to increase exhaust temperature, thereby allowing regeneration of the particulate filter.

Any method known to those skilled in the art for increasing exhaust gas temperature of a compression ignition engine can be used such as, for example, throttling the engine intake, increasing exhaust gas recirculation amount, adjusting injection timing, or combusting fuel during an exhaust stroke of the engine. Next, in step 316, the regeneration flag is set.

Figure 4:
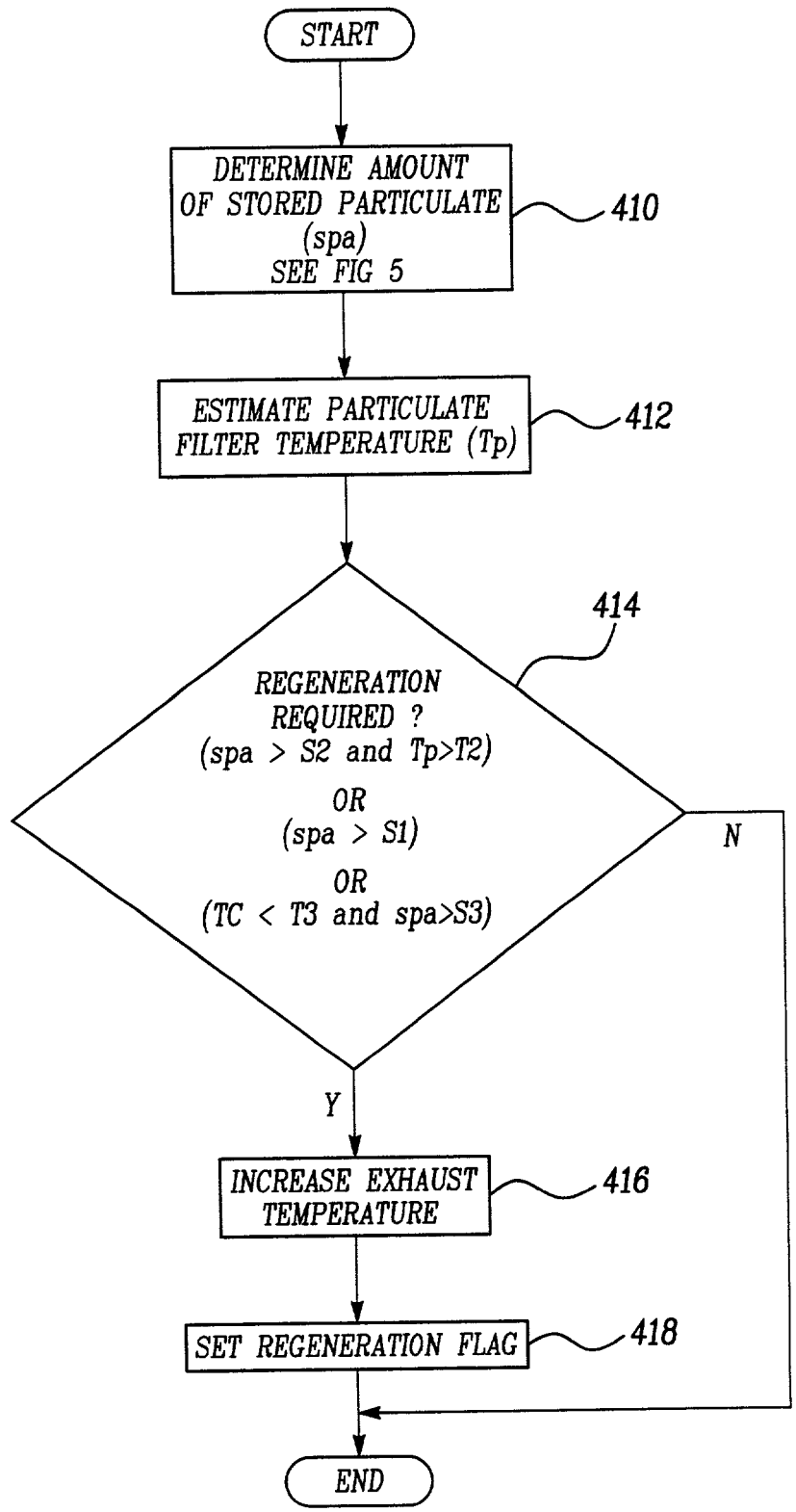

Referring now to FIG. 4, an alternate routine for determining whether regeneration of the particulate filter is required is described. First, in step 410, the amount of stored particulates (spa) is determined, as described later herein with particular reference to FIG. 5. Then, in step 412, the particulate filter temperature (tp) is estimated. In a preferred embodiment, the particulate filter temperature is estimated based on engine operating conditions using characteristic predetermined maps stored in memory. The engine operating parameters used comprise engine speed, fuel injection amount, fuel injection timing, and engine temperature. Any other method known to those skilled in the art for estimating temperature of an emission control device can be used to advantage with the present invention. Next, in step 412, the determined is made as to whether particulate filter regeneration is required. In particular, it is determined in step 414 whether stored particulate amount (spa) is greater than limit amount S2 and particulate filter temperature is greater than temperature limit T2, or whether stored particulate amount (spa) is greater than limit amount S1, or whether catalyst temperature (Tc) is less than temperature limit T3 and stored particulate amount (spa) is greater than limit amount S3.

In one aspect of the present invention, temperature limit T3 represents a light off temperature. Thus, according to the present invention, when catalyst 97 is below a light off temperature and there are enough stored particulates to burn (limit S3), regeneration is used to increase catalyst temperature Tc.

In another aspect of the present invention, when temperature limit T2 below regeneration temperature and limit amount S2 represents an amount of stored particles less than S1, but greater than S3. Thus, the present invention takes advantage of high filter temperature that may be encountered during certain driving conditions by purging stored particulates at this time. Thus, only a small amount of energy is used to increase the filter temperature to the regeneration temperature, thereby increasing fuel economy by opportunistically regenerating the filter.

Also in this example, limit S1 is greater than S2. In this way, the routine takes advantage of situations where little fuel economy is lost to regenerate the particulate filter. For example, even when the particulate filter is not completely full but the particulate filter temperature is very close to the regeneration temperature, only a small amount of energy is needed to bring the particulate filter to the regeneration temperature thereby efficiently regenerating the particulate filter. When the answer to step 414 is YES, the routine continues to step 416 where exhaust gas temperature is increased. Next, in step 418, the regeneration flag is set.

Figure 5:
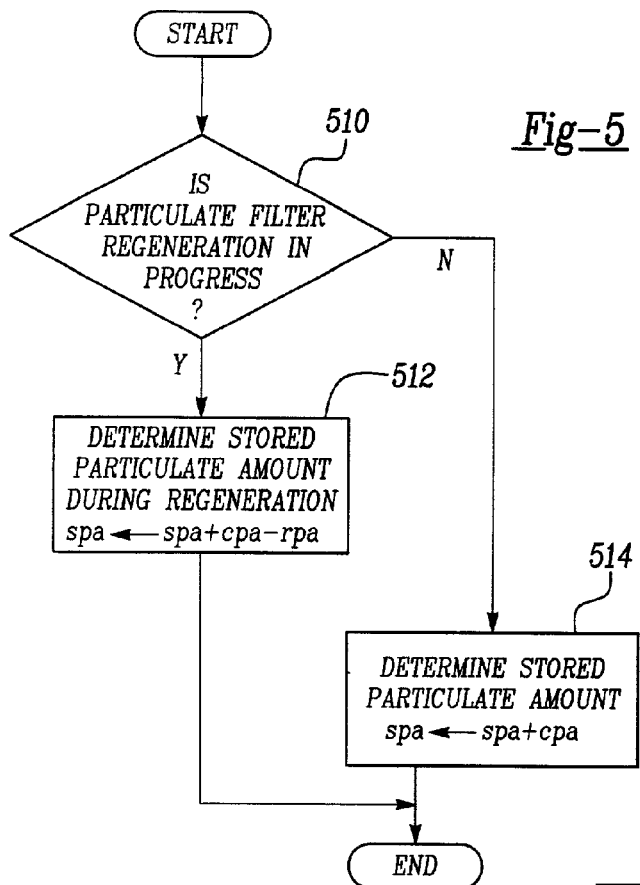

Referring now to FIG. 5, a routine is described for determining stored particulates. First, in step 510, a determination is made as to whether the particulate filter is currently in the regeneration process, for example, by checking the regeneration flags in step 418. When the answer to step 510 is YES, the routine continues to step 512. In step 512, the routine determines the stored particulate amounts during regeneration by including the particulates generated by the combustion process (cpa), the current stored particulate amount (spa), and the amount of particulates released during the regeneration stage (rpa). Otherwise, the routine moves to step 514 and determines the stored particulate amount based on the current stored particulate amount and the particulates produced during the combustion process. In a preferred embodiment, the amount of particulates generated during the combustion process (cpa) is determined based on engine operating conditions such as fuel injection amount and engine speed. Also, the amount of released particulates during the regeneration process (rpa) is determined based on exhaust gas space velocity and particulate filter temperature (tp).

Figure 6:
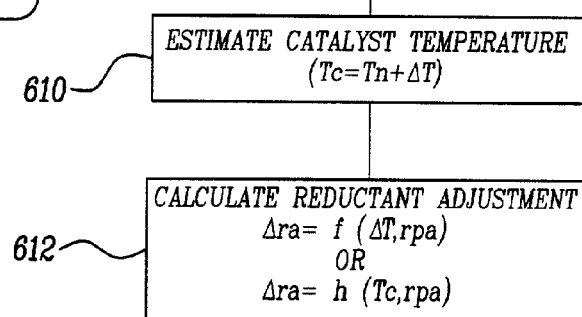

Referring now to FIG. 6, a routine for calculating the reductant amount adjustment (Δra) is described. First, in step 610, the catalyst temperature (Tc) is estimated based on engine operating conditions. In particular, catalyst temperature (Tc) is estimated based on a normal estimated temperature (Tn) based on engine operating conditions that represents catalyst temperature under normal conditions. Catalyst temperature (Tc) is also estimated based on a delta temperature (DT) that represents the additional temperature due to the heat generated by the particular filter regeneration. In an alternative embodiment, catalyst temperature (Tc) can be read from sensor 142 if available. Also, particulate filter temperature (Tp) can be estimated based on engine operating conditions. Further, (Tp) represents the actual, or estimated temperature, while (Tpn) represents an estimated particulate filter temperature that would be obtained without the purposely changing engine operating conditions to increase heat to the exhaust system.

Next, in step 612, the reductant amount adjustment (Δra) is determined based on a function (f) of delta temperature (DT) and the amount of particulates released during the regeneration process (rpa). Function f is highly dependent on catalyst formulation. In particular, the amount of available reducing agent produced during the regeneration processes depends on whether the catalyst formulation can make use of the products of regeneration. For example, during the regeneration process, CO may be produced. If the catalyst formulation is such that CO can be used to reduce NOx, then the amount of reducing agent to be injected (ra) must be adjusted based on the amount of CO released during regeneration. However, if the catalyst material cannot make good use of CO, then a different amount of adjustment is made to signal (ra). In an alternative embodiment, another function, h, can be used where catalyst temperature (Tc) is used rather than delta temperature (DT).

Continuing with FIG. 6, in step 614, a determination is made as to whether adjusted reductant amount (ra_a) as determined in step 216 is less than zero. When the answer is YES, regeneration is discontinued and regeneration flag is un-set in step 616. In an alternate embodiment (not show), a determination as to whether adjusted reductant amount (ra_a) as determined in step 216 is less than a predetermined value (PV1) can be used, where the predetermined value is used to give more flexibility rather than strictly using zero. Thus, a determination is made as to whether it is possible to maintain the correct total amount of reductant needed to maximize efficiency of catalyst 97. When so much reductant is being released by filter 95 during regeneration that even by completely discontinuing reductant addition, there is still excess reductant, regeneration is discontinued. For example, the predetermined value (PV1) can represent a maximum amount of excess reductant tolerated in catalyst 97 (thereby being a negative value used in the comparison of step 614).

Those skilled in the art will recognize that various other alternative embodiments can be used to yield a similar result. For example, when external reductant is not added, particulate filter regeneration can be discontinued when an amount of reductant released during the regeneration process reaches a predetermined maximum value. In other words, when an amount of reductant released during regeneration is greater than that which can be utilized by catalyst 97, regeneration is terminated. Regeneration can be terminated in many way, for example, by discontinuing elevation of exhaust temperature, or by intentionally cooling exhaust gas using injection timing, or any other control variable known to those skilled in the art.

In another alternative embodiment, reductant amount adjustment (Δra) can be compared to base reductant amount (ra) and when (Δra) is greater than (ra), regeneration terminated. Those skilled in the art will recognize this as an alternative embodiment of step 614 as described previously herein.

Figure 7:
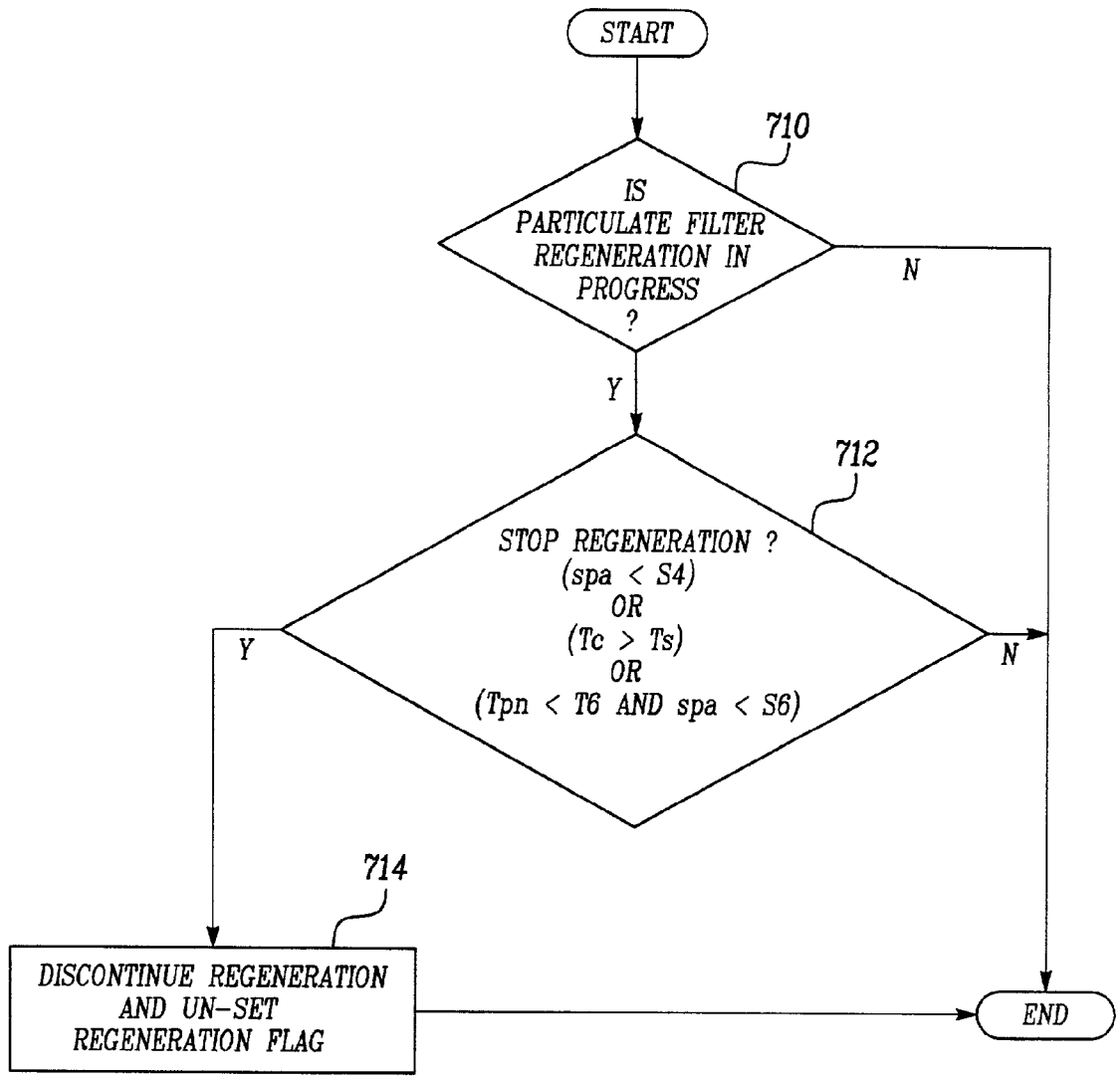

Referring now to FIG. 7, a routine for deactivating particulate filter regeneration is described. First, in step 710, a determination is made as to whether the particulate filter is currently in the regeneration process, for example, by checking the regeneration flags in step 418. When the answer to step 710 is YES, a determination is made in step 712 as to whether stored particulate amount (spa) is less than limit amount S4, or whether catalyst temperature (Tc) is greater than limit T5, or whether particulate temperature during non regeneration operation (Tpn) is less than limit T6 and stored particulate amount (spa) is less than limit S6.

In one aspect of the present invention, limit amount S4 represents when particulate filter 95 is regenerated. Thus, the regeneration can continue until filter 95 is fully regenerated. In another aspect of the present invention, temperature limit T5 represents a maximum temperature limit above which catalyst degradation can occur. Thus, regeneration is discontinued to reduce exhaust temperatures so that degradation of catalyst 97 is avoided. In yet another aspect of the present invention, temperature limit T6 represents a temperature at which filter 95 would normally operate without regeneration. Thus, if the amount of heat added to sustain regeneration is too large and the stored particulate amount (spa) indicates through comparison with limit S6 that there is a certain amount of storage capability, regeneration is terminated. Thus, improved fuel economy can be achieved while minimizing emissions.

Continuing with FIG. 7, when the answer to step 712 is YES, the routine continues to step 714 where regeneration is deactivated and regeneration flag unset.

This concludes the description of the Preferred Embodiment. The reading of it by those skilled in the art would bring to mind many alterations and modifications without departing from the spirit and scope of the invention. Accordingly, it is intended that the scope of the invention be limited only by the following claims.

The invention claimed is:

1. A method for managing regeneration of a particulate filter communicating with an engine exhaust upstream of a catalyst, the method comprising:
estimating an amount of stored particulates in the particulate filter;
determining a condition of the catalyst; and
discontinuing regeneration of the particulate filter dependent on said amount and said determined condition of the catalyst, wherein said condition is a catalyst temperature.

2. The method recited in claim 1 wherein said discontinuing of the particulate filter regeneration occurs when said amount is below a predetermined value and said catalyst temperature is above a predetermined value.

3. The method recited in claim 2 wherein said predetermined value is a temperature above which degradation can occur.

4. A method for managing regeneration of a particulate filter in an emission system coupled to an engine exhaust, the method comprising:
indicating when an operating condition exists where damage to a portion of the emission system can occur, wherein said portion includes a catalyst coupled in the system downstream of the particulate filter;
reducing regeneration of the particulate filter in response to said indication; and
adding reductants to said emission system.

5. The method recited in claim 4 wherein said reducing regeneration further comprises discontinuing regeneration.

6. The method recited in claim 4 wherein said portion of the emission system comprises a lean NOx catalyst coupled to the particulate filter.

7. A system for managing regeneration of a particulate removing apparatus communicating with an engine exhaust, the system comprising:
an emission system having the particulate removing apparatus coupled upstream of a catalyst; and
a controller for providing an indication that a condition exists that can damage a portion of the emission system, said portion including said catalyst, for reducing regeneration of the particulate removing apparatus in response to said indication and for adding reductants to said emission system.

8. The system recited in claim 7 wherein said reducing regeneration comprises discontinuing regeneration.

9. A system for managing regeneration of a particulate removing apparatus communicating with an engine exhaust, the system comprising:
an engine;
an emission system coupled to said engine, said emission system having the particulate removing apparatus coupled upstream of a catalyst; and
a controller for providing an indication that a condition exists that can damage a portion of the emission system including said catalyst, for reducing regeneration of the particulate removing apparatus in response to said indication, and for adding reductants to said emission system.

10. The system recited in claim 9 wherein said adding reductants by said controller comprises directly injecting fuel into said engine.

11. The system recited in claim 9 wherein said adding reductants by said controller comprises directly injecting fuel into the engine exhaust.

* * * * *